(12) United States Patent
Hutchings

(10) Patent No.: US 9,117,371 B2
(45) Date of Patent: Aug. 25, 2015

(54) MOBILE AUTONOMOUS SURVEILLANCE

(75) Inventor: Jeffrey L. Hutchings, Lehi, UT (US)

(73) Assignee: Harman International Industries, Inc., Farmington Hills, MI (US)

( * ) Notice: Subject to any disclaimer, the term of this patent is extended or adjusted under 35 U.S.C. 154(b) by 264 days.

(21) Appl. No.: 13/530,991

(22) Filed: Jun. 22, 2012

(65) Prior Publication Data

US 2013/0342333 A1    Dec. 26, 2013

(51) Int. Cl.
| | |
|---|---|
| *B60Q 1/00* | (2006.01) |
| *G08G 1/0967* | (2006.01) |
| *G08G 1/00* | (2006.01) |
| *G08B 25/00* | (2006.01) |
| *G08G 1/16* | (2006.01) |

(52) U.S. Cl.
CPC ........ *G08G 1/096791* (2013.01); *G08B 25/009* (2013.01); *G08G 1/096741* (2013.01); *G08G 1/162* (2013.01); *G08G 1/205* (2013.01)

(58) Field of Classification Search
None
See application file for complete search history.

(56) References Cited

U.S. PATENT DOCUMENTS

| | | | | |
|---|---|---|---|---|
| 5,956,081 | A * | 9/1999 | Katz et al. ..................... | 348/163 |
| 6,405,132 | B1 * | 6/2002 | Breed et al. .................... | 701/301 |
| 6,608,559 | B1 * | 8/2003 | Lemelson et al. ....... | 340/539.13 |
| 6,950,020 | B2 * | 9/2005 | Shimamoto et al. ..... | 340/539.16 |
| 7,382,274 | B1 * | 6/2008 | Kermani et al. ............. | 340/901 |
| 7,523,000 | B2 * | 4/2009 | Tengler et al. ................ | 701/301 |
| 8,160,764 | B2 * | 4/2012 | Choi et al. ..................... | 701/24 |
| 8,531,521 | B2 * | 9/2013 | Romanowich ................ | 348/143 |
| 8,655,543 | B2 * | 2/2014 | Tengler et al. ................ | 340/435 |
| 2004/0139470 | A1 * | 7/2004 | Treharne ....................... | 725/105 |
| 2007/0217763 | A1 * | 9/2007 | Siemens et al. ............... | 386/112 |
| 2008/0012693 | A1 * | 1/2008 | Shimomura ............... | 340/426.1 |
| 2010/0148940 | A1 * | 6/2010 | Gelvin et al. ............ | 340/286.02 |
| 2011/0025846 | A1 * | 2/2011 | Garrett .......................... | 348/143 |
| 2011/0043629 | A1 * | 2/2011 | Owen et al. ................... | 348/143 |
| 2011/0112720 | A1 * | 5/2011 | Keep et al. ...................... | 701/36 |
| 2011/0227712 | A1 * | 9/2011 | Atteck .......................... | 340/429 |
| 2013/0131918 | A1 * | 5/2013 | Hahne ............................ | 701/36 |
| 2013/0325344 | A1 * | 12/2013 | Yester ........................... | 701/533 |

OTHER PUBLICATIONS

Vehicular Communication Systems, From Wikipedia: http://en.wikipedia.org/w/index.php?title=Vehicular_communication_systems&printable+yes, Feb. 8, 2012.

ITS Research Fact Sheets; DSRC: The Future of Safer Driving; What is DSRC?; http://www.its.dot.gov/factsheets/dsrc_factsheet.htm, Feb. 8, 2012.

(Continued)

*Primary Examiner* — Julie Lieu

(74) *Attorney, Agent, or Firm* — Michael Spenner

(57) ABSTRACT

Various embodiments relate to creating and utilizing a vehicle surveillance network to monitor objects and/or events. Messages may be broadcasted from at least one communication system of a surveillance network which is communicating with one or more vehicles of the surveillance network and received in a vehicle. Instructions may be transmitted to at least one vehicle camera to capture one or more images of objects or events outside of the vehicle in response to receiving the at least one broadcasted message. At least one vehicle camera in each of the vehicles of the surveillance network may capture the images of the object and/or events. Further instructions may include transmitting the captured images from the one or more vehicles to one or more event responders.

16 Claims, 9 Drawing Sheets

(56) References Cited

OTHER PUBLICATIONS

What is Video Analystics?, http://www.agentvi.com/20-Technology-56-What_is_Video_Analytics, Mar. 5, 2012.
What is Video Analytics/Intelligent Video Surveillance, http://www.videoanalytics.net/articles/whatisva.html, Mar. 5, 2012.
What are Video Analytics?, http://www.ipsecurityexperts.com/articles/what-are-video-analytics.html, Mar. 5, 2012.
Dedicated Short Range Communications (DSRC) Service, http://wireless.fcc.gov/services/index.htm?job=about&id=dedicated_src, Feb. 8, 2012.

* cited by examiner

MOBILE AUTONOMOUS SURVEILLANCE

TECHNICAL FIELD

Various embodiments relate to mobile surveillance of the environment outside of a vehicle. In some embodiments, the mobile surveillance is accomplished through a network of vehicles having one or more vehicle cameras.

BACKGROUND

A threat to personal and public safety can occur anywhere. The threat may be more personal, such as a home invasion or carjacking, or it may be one that has an impact on the larger public. In public areas, such as airport, parking garages, schools, and the like, the potential for such threats are usually more diligently monitored in order to protect the health and safety of the public. Typically, cameras and alarm systems are set up in or around buildings in order to track and notify security and the police of the potential threat. Unfortunately, at times, events may not be captured because of the fixed location of these cameras, for example. Additionally, some public areas may not have a security system and may rely on personnel and/or public enforcement to monitor for security threats.

Increasingly, modern vehicles are being outfitted with one or more cameras. Typically, the cameras are front view cameras, but some vehicles also include rear view and/or side view cameras. As a feature of the vehicle that automotive manufacturers tout as providing additional passenger safety, the intended use of the cameras is to assist the driver. For example, the one or more cameras are used for lane detection, collision avoidance, parking assistance, and the like.

SUMMARY

A vehicle system for creating a vehicle surveillance network may include at least one vehicle camera in each of two or more vehicles. Each vehicle camera may capture one or more images of objects or events outside of the respective vehicles. The system may also include at least one communication module in each of the two or more vehicles which enables communication between the two or more vehicles of the vehicle surveillance network. The communication module may be a DSRC module or an embedded vehicle modem. Additionally, at least one vehicle computer in each of the two or more vehicles may be configured to broadcast at least one message via the at least one communication module to one or more vehicles of the vehicle surveillance network, transmit instructions to a vehicle camera to capture the one or more images, and transmit the captured image(s) from the one or more vehicles to one or more event responders.

In some embodiments, the vehicle system may also include one or more vehicle sensors for detecting the proximity of an object to the vehicle. In some embodiments, the system may include a wireless module for broadcasting at least one message to the one or more vehicles of the vehicle surveillance network.

In some embodiments, a location of the object may be determined using the captured images and transmitted to the one or more event responders.

In some embodiments, the vehicle computer may receive video capability information for at least one of the two or more vehicles. The video capability information may be transmitted via the communication module to one or more vehicles of the surveillance network to define an area of interest for surveillance.

In some embodiments, an alert may be output notifying the event responder of an object in a field of view of the vehicle camera if a threshold period of time has been exceeded. The threshold period of time may be based on the length of time that an object is in the field of view of the camera.

A method for utilizing a vehicle surveillance network to monitor objects and/or events may include receiving at least one broadcasted message via at least one communication module from one or more vehicles of a vehicle surveillance network. The communication module may be in each of two or more vehicles for enabling communication between the two or more vehicles of the vehicle surveillance network.

Instructions may be transmitted to at least one vehicle camera to capture one or more images of objects or events outside of a vehicle. The one or more images may be captured by a vehicle camera in each of the two or more vehicles. The one or more captured images may be transmitted from the one or more vehicles to one or more event responders.

In some embodiments, the captured images may be an aggregate of images creating a field of view. Further, the one or more images may be stitched together to create the aggregate of images.

In some embodiments, the broadcasted message may be transmitted from a vehicle in the vehicle surveillance network which is closest proximity to the receiving vehicle.

A vehicle system for utilizing a vehicle surveillance network to monitor objects and/or events may include at least one vehicle computer. The vehicle computer may be configured to receive at least one broadcasted message transmitted from at least one communication system of a surveillance network which is communicating with one or more vehicles in the surveillance network. As a non-limiting example, the at least communication system may be an embedded modem in the vehicle and a server remote from the vehicle.

In response to receiving the at least one broadcasted message, instructions may be transmitted to at least one vehicle camera to capture one or more images of objects or events outside of a vehicle. At least one vehicle camera in each of the two or more vehicles may capture the one or more images. The one or more captured images may be transmitted from the one or more vehicles to one or more event responders based on instructions from the vehicle computer.

In some embodiments, the surveillance network may be a vehicle to infrastructure (V2I) network. The surveillance network may include one or more roadside units for enabling V2I communication. In additional or alternative embodiments, the surveillance network may be a vehicle to vehicle (V2V) network.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Additionally, the disclosure and arrangement of the figures is non-limiting. Accordingly, the disclosure and arrangement of the figures may be modified or re-arranged to best fit a particular implementation of the various embodiments of the invention.

As vehicles increasingly include more sophisticated features, a vehicle becomes more than simply a mode of transportation. For example, vehicle to vehicle (V2V) communication is a feature offered in modern vehicles. V2V may be used to transmit information, such as safety warnings and traffic information, between vehicles. Some specific examples of V2V communication include lane departure warnings, exchanging traffic information to avoid congestions, and exchanging routing information. However, these are the typical uses of V2V. In conjunction with the other features and technology offered in a vehicle, such as in-vehicle cameras and connectivity, the way a vehicle is used can be completely redefined.

Figure 1:
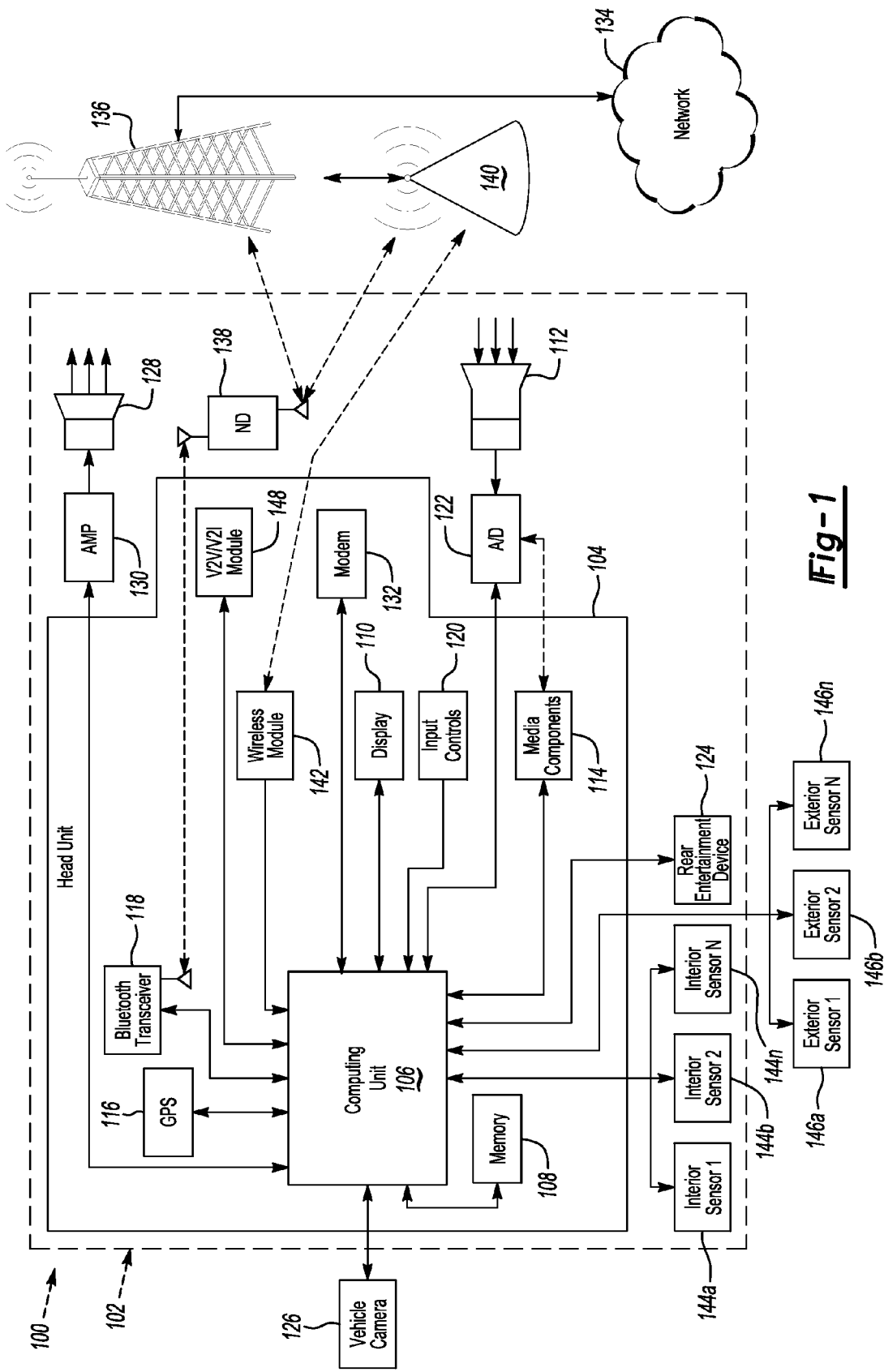
FIG. 1 illustrates a system topology of a vehicle computing system configured for external surveillance according to at least one embodiment.

FIG. 1 is a block diagram of a vehicle computing system (VCS) 100 configured for surveillance of an environment outside of a vehicle. As described herein, the vehicle 102 may be any vehicle forming the vehicle surveillance network. Within the vehicle 102, a head unit 104 may have a computing unit 106 having one or more processors (not shown) that provide for on-board processing of instructions and controls received by the VCS 100. Data that may be received and processed by the processor 106 may be stored in memory 108. The memory 108 may include non-persistent or volatile memory, such as (and without limitation) random access memory (RAM), and persistent or non-volatile memory, such as (and without limitation) a hard disk drive (HDD) or flash memory.

The head unit 104 may also include a visual front end interface, such as a display 110, located in the vehicle. The display 110 may be an LCD display or a graphical display. In some embodiments, the interface may have a touch sensitive screen. In additional or alternative embodiments, the interaction with the VCS 100 may occur through, button presses, audible speech and/or speech synthesis and displayed on display 110.

The VCS 100 is also provided with a number of different modules through which the user can interface or interact with the VCS 100. For example, the vehicle 102 may be provided with a microphone 112, one or more media components 114 (e.g., and without limitation, one or more input modules, such as, and without limitation, an auxiliary input or USB input for connected devices, a radio, a CD/DVD player, satellite radio, and the like), a GPS module 116, and a BLUETOOTH module 118. Additional media components may include one or more rear entertainment devices 124. The rear entertainment device 124 may include one or more media players (e.g., a DVD player) and one or more displays visible to rear seat passengers from which video, picture and/or audio may be output.

The computing unit 106 may be in communication with a vehicle network (not shown) that communicates data to and from the various modules. Non-limiting examples of a vehicle network include an SAE J1850 bus, a CAN bus, a GMLAN bus, an AVB network, and any other vehicle data buses known in the art.

Additional modules of the VCS 100 may include one or more vehicle cameras 126. The vehicle cameras 126 may be front or rear view cameras and/or in the vehicle. For purposes of simplicity, a single camera 126 is shown at the front of the vehicle 102. Further, the camera(s) 126 may be high, medium, or low resolution camera(s). In some embodiments, the resolution of the camera 126 is at least SD (720×480 pixels) and has a frame rate of at least 30 Hz. The cameras 126 may be both color and infrared to support night vision applications. The camera(s) 126 also have features such as, and without limitation, shutter control, white balance control, digital pan/tilt, and power up/down. The camera(s) 126 in each vehicle of the vehicle network may be time synchronized with each other in order to support building aggregate frames from all cameras to form composite scenes. In some embodiments, the camera(s) 126 may be a wide angle (e.g., fish eye) camera. The output of the camera(s) 126 may be presented on the display 110 and/or on one or more rear-entertainment devices 126.

One or more input controls 120 may also be provided to allow a user to swap between and activate various modules. Signals passing from the microphone 120 may pass through one or more analog-to-digital converters 122 before being passed to the processor 106 and vice-versa. Additionally, signals to and from some media components 114 (e.g., AM/FM radio) may also pass through one or more A/D converters 122 before being passed to or from the processor 106. For purposes of simplicity, one A/D converter 122 is shown. However, multiple A/D converters 122 may be arranged in the system 100.

The output from one or more vehicle modules of the VCS 100 may be audible and/or visual output. Audible output may be output from one or more in-vehicle speakers 128. The speaker(s) 128 may be connected to an amplifier 130 and may receive its signal from the processor 106. In some cases, the signals may pass through a digital-to-analog (D/A) converter (not shown). Visual outputs may be output on the display 110 and/or on one or more rear entertainment devices 124.

The vehicle 10 may include an on-board modem 132 for two-way communication of data and messages between the vehicle 102 and an external network 134. As a non-limiting example, modem 132 may be a USB cellular modem. As an alternative example, the modem may be an embedded modem in the vehicle 102. The data and messages may be exchanged by communicating with the one or more cellular towers 136.

Alternatively, via a BLUETOOTH transceiver 118 in the vehicle, a communication or pairing may be made automatically with a user's portable (sometimes referred to as "nomadic") device 138 (e.g., mobile phone, smart phone, PDA, or any other device having wireless remote network connectivity) after a vehicle key-on. In some embodiments, pairing the portable device 138 and the BLUETOOTH transceiver 118 may be instructed through one or more buttons or similar input (not shown). The one or more buttons may be one or more hard keys located in the vicinity of the vehicle driver and/or one or more soft keys shown on the display 18. The soft keys may or may not be touch-sensitive (e.g, on a touchscreen display). Additionally or alternatively, the soft keys may be one or more physical buttons mapped to the one or more soft keys.

In yet an alternative embodiment, connectivity may be accomplished using a USB connection linking the nomadic device 138 with the head unit 104 via a USB module. In some embodiments, this connection may only be enabled using an accessory protocol. Non-limiting examples of accessory protocols include the IPHONE accessory protocol or the ANDROID accessory protocol.

Using the portable device 138, communication with an external network 134 may be accomplished through, for example, communication with a cellular tower 136 and/or a wireless access point 140. Data may be communicated from the vehicle 102 (e.g., from the processor 106) to the network 134 utilizing, for example, a data-plan, data over voice, or DTMF tones associated with nomadic device 54.

Additionally or alternatively, the vehicle 10 may be outfitted with one or more wireless modules 142 for wireless communication with the network 134. A non-limiting example of such a wireless communication is any communication meeting the 802.11 IEEE standard such as WiFi or WiMax. To communicate with the network 134, a connection may be made to a wireless hotspot 140 (or wireless access point) which may be outside and remote from the vehicle (e.g., and without limitation, at a publically available hotspot venue). In some embodiments, a wireless hotspot may be created in the vehicle and communication with the network 134 may be accomplished by wirelessly connecting one or more compatible devices in the vehicle with the in-vehicle wireless access point. For purposes of simplicity and clarity, FIG. 1 shows an external hotspot 140.

The processor 106 may be provided with an operating system including an API to communicate with modem application software. The modem application software may access an embedded module or firmware on the BLUETOOTH transceiver 118 to complete wireless communication with a remote BLUETOOTH transceiver (such as that found in a nomadic device).

The nomadic device 138 may be capable of voice band and/or broadband data communication. A user may be able to transfer data over the voice band using a technique called frequency division multiplexing. Thus, a user of the nomadic device 138 may be able to talk over the device while data is being transferred. If the user has a dataplan associated with the nomadic device 138, broadband transmission may be possible.

Incoming data to the VCS 100 may be passed through the nomadic device 1387 via a data-over-voice or data plan through the onboard BLUETOOTH transceiver 118 and into the vehicle's internal processor 106. Alternatively, the data may be passed through the modem 132 via cellular communication to the processor 106. Alternatively, the data may be passed through the wireless module 142 via, e.g., a WiFi connection, to the processor 106. Data may be stored in the memory 108 of the VCS 100.

Additionally communicating with the computing unit 106 may be one or more interior sensors 144a, 144b . . . 144n (generally referred to herein as interior sensors 144) and one or more exterior sensors 146a, 146b . . . 146n (generally referred to herein as exterior sensors 146). As will be described in further detail below, exterior sensors 146 may include proximity sensors which may detect the proximity of one or more vehicles for establishing the surveillance network with the nearby vehicles. Additionally or alternatively, the exterior sensor(s) 146 may be used to detect the proximity of one or more objects. Interior sensors 144 may be used for intrusion detection, driver or passenger detection, and other functions. Additional exterior 146 and/or interior 144 sensors may include, but are not limited to, ultrasonic proximity sensors for echo ranging, radar (which, in some embodiments, may also be used for adaptive cruise control), interior ultrasonic sensors for intrusion detection (e.g., glass breakage), interior temperature detectors, and/or pressure sensors (e.g., in the seats).

One or more 148 modules for vehicle-to-vehicle (V2V) or vehicle-to-infrastructure (V2I) communication may also communicate with the processor 106. The module 148 may be for dedicated short range communications (DSRC), wireless access in vehicular environment (WAVE), WiFi, or other like wireless communication enabling V2V or V2I communication. The module(s) 148 may be transceivers that enable two-way short to medium range (e.g., up to 1000 meters) wireless communication capabilities. Typically, the dedicated short range communication works on a 5.9 GHz band with bandwidth of 75 MHz. In addition to being on-board in a vehicle, enabling vehicle to vehicle (V2V) communication with other capable vehicles, nodes may also be roadside units (RSUs) enabling vehicle to infrastructure (V2I) communication. A vehicle may exchange information with one or more other vehicles such as information obtained from one or more interior sensors 144, one or more exterior sensors 146, or one or more other modules (e.g., and without limitation, the GPS module 116). As one example, V2V may be used to alert in two different vehicles about one vehicle approaching the other. The alerts may be a vehicle seat vibration, repeated brake light flashing, graphics shown on a display, and the like. The messages received during a V2V or V2I exchange are typically transmitted within the vehicle over a vehicle network.

Alternatively or additionally, the embedded modem 132 may be used for V2V communication. The embedded modem 132 may communicate with an embedded modem 132 of one or more other vehicles via one or more remote servers (not shown) and network 134. Data may be exchanged between the vehicles via the remote server(s). For example, a call may be made to the server from a first vehicle and a connection established with the second vehicle by the server(s). Phone numbers for the embedded modems may be stored on, or separately from, the server(s) in order to establish the connections. For purposes of simplicity, module 148 will be used herein to refer to all embodiments of a V2V communication system.

Figure 2:
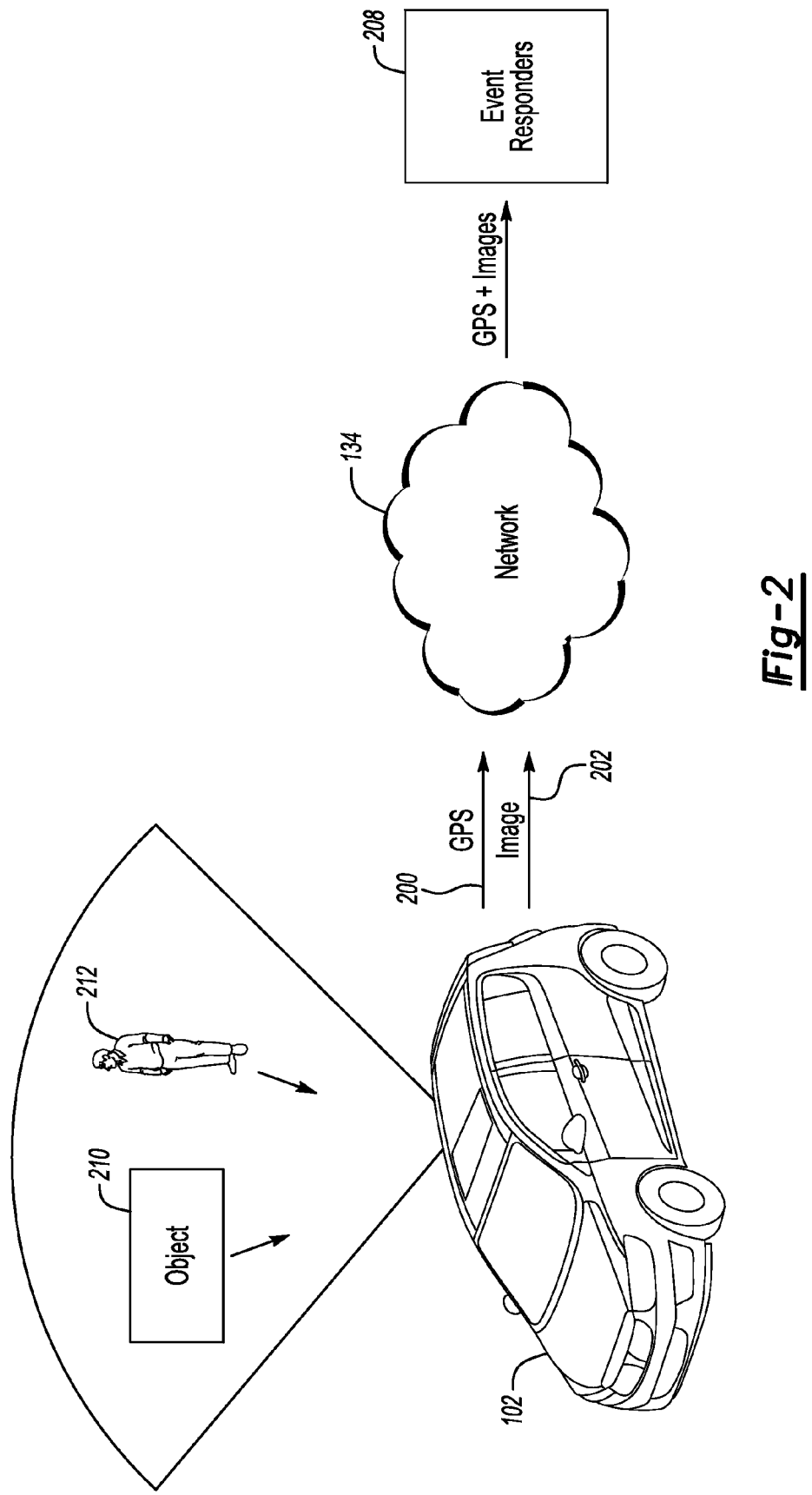
FIG. 2 illustrates at least one embodiment of the data exchange between a vehicle and event responders comprising a part of the surveillance.

In the vehicle surveillance network, a vehicle communicates with other vehicles via the module 148 exchanging messages about the presence of an event. Based on the messages, multiple vehicles may form the surveillance network. The surveillance network may be used to provide additional security in high security and high traffic areas such as an airport or other public venues. For example, suspicious activity, such as objects lying on a sidewalk alone for an extended period of time or a pedestrian hovering around a vehicle, may be detected by the surveillance network and reported to event responders. As shown in FIG. 2, the vehicle 102 captures images of the object 210 and/or person(s) 212 as still images and/or video (generally referred to herein as "images"). To inform the event responders 208 of the captured activity, the images 202 may be transmitted to the event responder 208 via the network 134. The transmission may be via WiFi, cellular, or other wireless communication means. In some embodiments, GPS information 200 may also be transmitted to the event responders 208, which may be used for tracking the carjacker, identifying the location of the vehicle, identifying the location of the object, and the like. As used herein, event responder refers to any individual or entity that may respond to the event including, but not limited to, police, medical responders, firefighters, venue security, and/or the vehicle owner.

Figure 3:
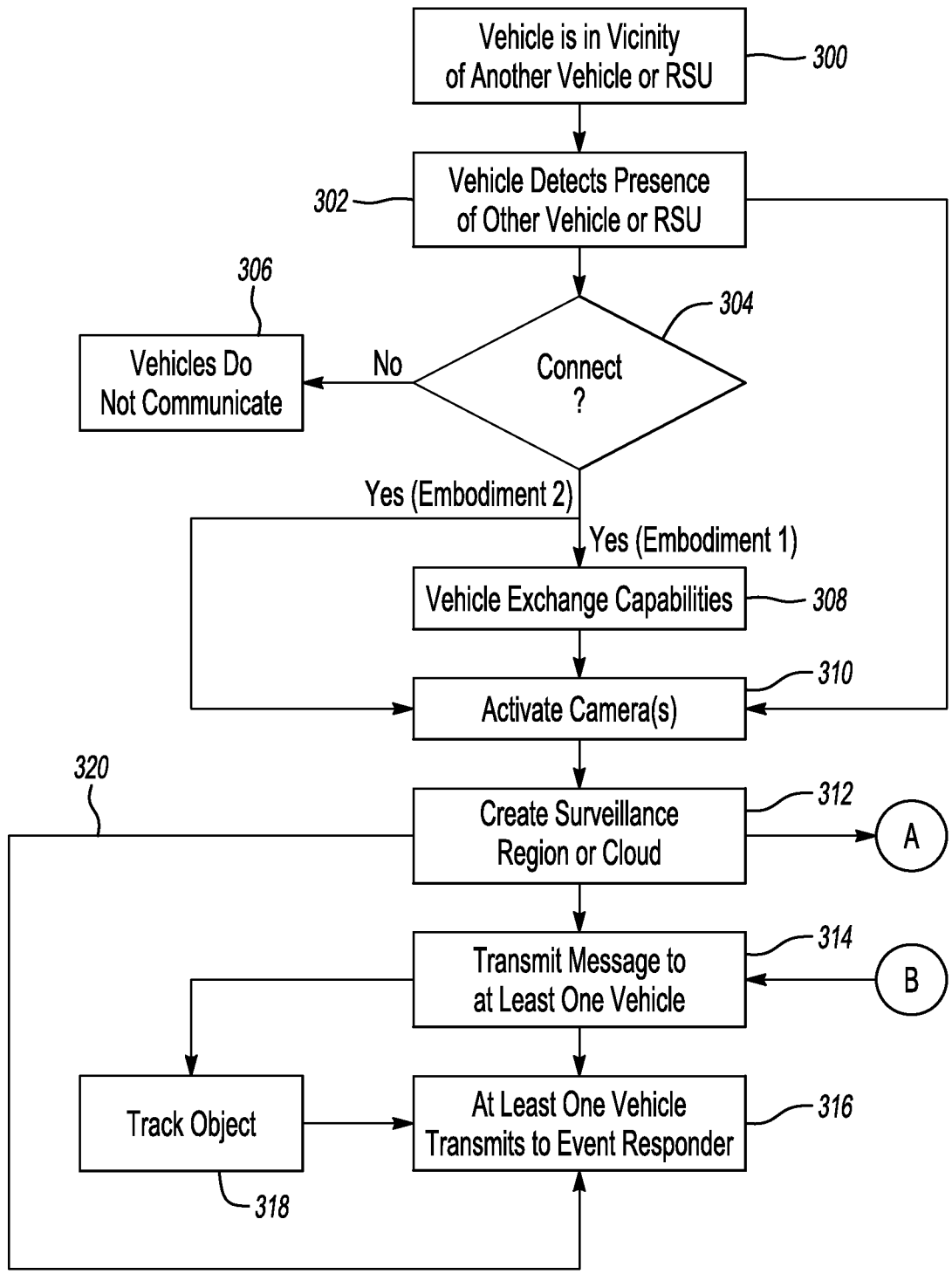
FIG. 3 illustrates the process for establishing a vehicle surveillance network.

FIG. 3 illustrates a process for establishing the vehicle surveillance network. The process and operations may be executed by software (a computer program product) on the head unit 104. One or more vehicles will be in the vicinity of another vehicle which may be either stationary or approaching (block 300). For example, at least two vehicles may be within and up to 1000 meters of each other. A vehicle may detect the presence of the one or more other vehicles in the vicinity or range of detection as detected from one or more proximity sensors 146 on the vehicle and/or by the module 148 (block 302).

In some embodiments, location information of the detected vehicle(s) may be received by the vehicle 102, for example, through a broadcast, via module 148, of GPS information. Using location information, vehicle 102 may also determine which vehicles can capture images of the detected object(s), person(s) and/or the surrounding environment based on location of the vehicle(s). One or more messages may be exchanged with these vehicles that can capture such images.

Alternatively or additionally, a vehicle may detect one or more roadside unit (RSUs) which are V2I modules located along a highway, pedestrian passageway, or which may be affixed to structures such as homes, office buildings, schools, and the like. RSUs are like LAN access points and provide communication between a vehicle and an infrastructure. A non-limiting example of using an RSU according to the various embodiments of the invention will be described below with respect to FIG. 8. The remaining examples and description, while applicable to a V2I communication, will be described in the context of a V2V communication.

Once one or more vehicles are detected, information and messages may be exchanged automatically between the vehicles. In some embodiments, a determination may be made first as to whether a connection is possible (block 304). Thus, a connection may not be automatically established. For example, a connection may be established after the vehicle 102, via the head unit 100, first requests a connection with one or more vehicles in the vicinity and the connection accepted by the other vehicles. This exchange may occur in cases where vehicle owners choose to decide whether to be a part of the surveillance network. The other vehicle owners may manually accept or reject a request to establish the connection. Additionally, some vehicles may not be capable of establishing a V2V connection, or the capabilities for establishing a V2V connection are disabled (e.g., the module 148 in a vehicle), in which case a determination may be made whether a connection is possible. If a connection is not possible, or another vehicle rejects the connection request, the vehicle 102 may not communicate with that vehicle (block 306). However, a connection may be established anytime, even in cases where the V2V capabilities are later turned on or after the vehicle user has rejected the request.

In one embodiment (represented as embodiment 1), the vehicle 102 may negotiate a connection with other vehicles by transmitting one or more messages to a vehicle within its vicinity (block 308) which may include its capabilities. For example, the message(s) may include video capabilities of the vehicle camera 126 including, but not limited to, the number of cameras, the field of view (e.g., fisheye), and camera positioning or angle of view. The exchange of video capability information may be used to define an area of interest, e.g., the aggregate field of view captured through video or one or more images by the vehicles. The messages may include additional information including, but not limited to, number and location of proximity sensors, wireless communication capabilities (e.g., and not limited to, cellular or WiFi), storage capabilities including, but not limited to, capacity and type, GPS coordinates, and whether the vehicle is stationary or moving.

Within each vehicle, one or more messages may be transmitted from the computing unit 106 via the vehicle network to one or more camera(s) 126. The camera(s) 126 may be activated in response to the message communication and data exchange between the vehicles (block 310). As a non-limiting example, the camera(s) 126 may be activated when the capabilities of the camera 126 are requested from the vehicle camera 126.

In other embodiments (represented as embodiment 2), the vehicles may operate autonomously. For example, the camera(s) 126 may be activated (block 310) once a connection is established between the vehicles. Each vehicle 102 knows capabilities of its vehicle camera and does not share this information with other vehicles nor receive requests from other vehicles for this information. Based on the capability information, each vehicle may determine if it is capable of being a member of the network and capture images of objects, persons and/or surroundings.

Based on the communication between the vehicles and the activation of the camera(s) 126 in each vehicle, a surveillance region may be created (block 312). The surveillance region may be a cooperative network of multiple vehicles which capture images of the environment outside of the vehicle including, but not limited to, objects, persons, and surroundings as an aggregate field of view. As represented by circle block A and continuing on FIG. 4-7 described below, one or more vehicles in the network may detect objects and/or events outside of the vehicle. Upon detecting the object and/or event, the vehicle 102 may broadcast one or more messages and notify other vehicles of the object and/or event (block 314). The message(s) may be transmitted to the surveillance network and at least one vehicle in the network having capability to respond may receive the message(s). Additionally or alternatively, the message(s) may be transmitted to specific vehicle. At least one vehicle within the network may transmit one or more messages to an event responder regarding the detected object and/or event (block 316). Alternatively, the detecting vehicles may directly transmit 320 one or more messages to the event responder 208.

As one non-limiting example of transmitting messages to a specific vehicle, the detecting vehicle of the object or event may send an alert to a nearby vehicle as determined from at least one of the proximity sensors 146, location information, or vehicle identification information exchanged between vehicles of the surveillance network. The information may be stored in memory 108 (e.g., in volatile memory) of the head unit 104. The head unit 104 of the detecting vehicle transmits instructions via module 148 to the receiving vehicle instructing the receiving vehicle to activate its camera.

As an alternative example, one or more messages may be sent from the detecting vehicle to a nearby vehicle regarding the presence of an object or event. The vehicle receiving the message(s) may be configured to activate the camera based on the receipt of such message(s). Generally, each head unit 104 of a vehicle in the surveillance network may be programmed to perform actions depending on whether it is detecting the object/event or receiving message(s).

The message(s) transmitted to the vehicle(s) of the surveillance network and/or the event responder may include information identifying the detecting vehicle 102. As one non-limiting example, vehicles may have electronic vehicle identification number (VINs). As another non-limiting example, using GPS coordinates or dead reckoning coordinates of the vehicle 102 and the VINs, the vehicle may be uniquely identified as well as located. As another non-limiting example, unique, but volatile (temporary) vehicle IDs may be used. When vehicles join the surveillance network, each vehicle may negotiate an ID which may be used until the vehicle exits the surveillance network area and is dropped off the network. In the next surveillance network, the vehicle may have a different ID.

In some embodiments, an object and/or person may be tracked through the surveillance network (block 318). For example, the location of the object and/or person, whether stationary or moving, may be provided by at least one vehicle of the surveillance network to an event responder 208. Using one or more proximity sensors 146, camera(s) 126, and GPS or dead reckoning data, the vehicle may identify the location of the object(s) and/or person(s). Further, the trajectory and the speed of a moving object, such as a person, may be determined.

Figure 4:
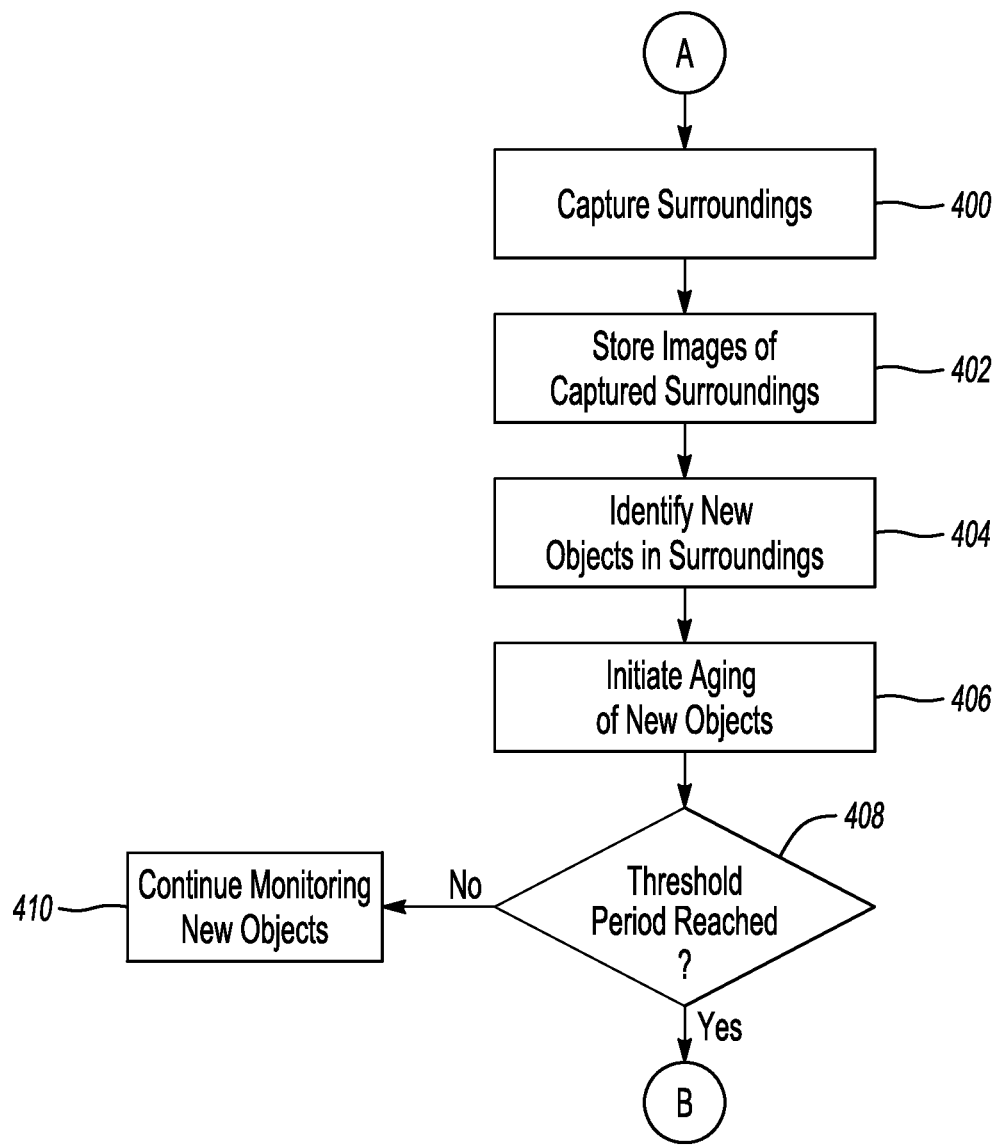
FIG. 4 illustrates a process of detecting an object by the vehicle surveillance network.

Continuing from circle block A in FIG. 3 and shown in FIG. 4, the surveillance network may detect and capture images of objects in the area of interest. The images of the area of interest may be analyzed through, for example, video analytics, to identify the one or more objects in the area of interest. Video analytics is a surveillance tool which uses sophisticated algorithms and computerized processing to analyze digitized images, for example, at the pixel level, for detecting objects and persons, identifying events, motion tracking, and the like. In one or more embodiments, the algorithms may be programmed to software on the head unit 104. In additional or alternative embodiments, the software may be executing on one or more computers (e.g., servers) remote from the vehicle 102 which communicate with the computing unit 106 of the vehicle 102 via a wireless connection (e.g., and without limitation, WiFi or cellular) over network 134. In this case, the images may be captured by the camera(s) 126 and processed and analyzed at the one or more remote server(s) (not shown).

The software may include one or more rules or policies defining when a message is sent to the other vehicles in the surveillance network based on the detection and identification of an object and/or person. In some embodiments, the rules or policies may be defined as part of the video analytics algorithms. As a non-limiting example, an aging algorithm, or a threshold period of sitting time for an object visible in the area of interest, may be defined. As another non-limiting example, the presence of at least one person near the object of interest may be a defined policy. As another example, policies may be defined based on an object that is on the person of a detected person of interest. For example, the detection of a carjacking tool on the person may trigger an alert to other vehicles. Conversely, the detection of vehicle keys on a person may not trigger an alert.

The software may also be programmed to establish location information based on GPS data of an object and/or person from the GPS module 116 and/or information from one or more proximity sensors 146. In addition, the software may be programmed to determine the speed and trajectory of a moving object.

Referring now to FIG. 4, the vehicle camera(s) 126 may capture images of the surroundings around the one or more vehicles 102 of the vehicle surveillance network (block 400). The captured images by a camera in a vehicle may form a field of view which comprises an area of interest. Where the images are captured by multiple cameras in the surveillance network, the aggregate of the images (or field of view) may comprise the area of interest. In this case, the aggregate images may be time aligned and stitched together to form a continuous video image. The images may be stitched together remotely from the vehicle, e.g., at one or more of the remote network of computers. It will be appreciated that while the surveillance network comprises multiple vehicles, the images may be captured by only one vehicle. The detecting/capturing vehicle may transmit messages to other vehicles in the network who may respond as described below. FIG. 4 will be described in conjunction with FIG. 5, which illustrates an implementation of the process of FIG. 4 according to one embodiment.

The surroundings may be dynamic such that there is a constant change of vehicles, objects and persons entering and exiting the surroundings. The dynamic surroundings may be stored (block 402) in memory 108 of one or more vehicles. Additionally or alternatively, the surroundings may be transmitted from the VCS 100 and stored on the one or more servers remote from the vehicle. As a non-limiting example, and referring briefly to FIG. 5, the remote network of computers may be provided by an airport or other public venue 500. The remote network may be part of a larger security network provided by the public venue.

Figure 5:
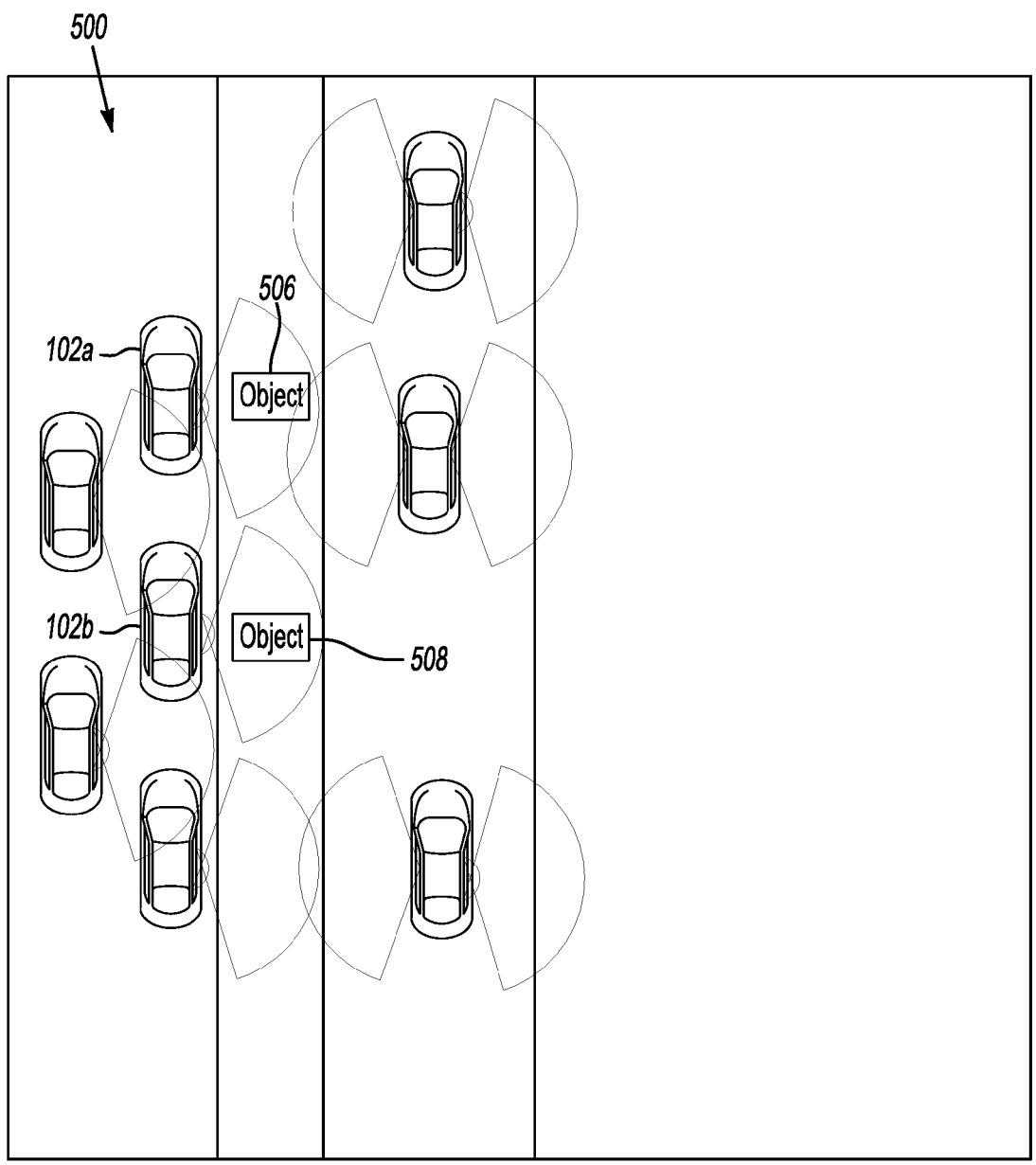
FIG. 5 illustrates a non-limiting example of the process of FIG. 4.

One or more vehicles of the surveillance network may capture and store information on specific objects within the field of view (block 404). FIG. 5 shows two objects 506 and 508 within the field of view of vehicle 102a and vehicle 102b, respectively. The remaining vehicles (not labeled in FIG. 5) comprise part of the vehicle surveillance network. Of course, while not shown in FIG. 5, the number of vehicles that could comprise the vehicle surveillance network is potentially unlimited. Vehicles 102a and 102b may initiate an aging algorithm to determine the amount of time that the object 506, 508 has been in the vehicle's field of view (block 406). Objects that may be in the field of view for an extended period of time may trigger an alert. The alert may indicate, for example, potential suspicious activity or a security threat. In some embodiments, a threshold period of time may be defined as part of the aging algorithm (block 408). If the object 506, 508 is within the field of view longer than the threshold point, the process may continue at circle block B and shown in FIG. 3. Alternatively, the vehicle 102a, 102b may continue to monitor the object of interest 506, 508 until the threshold period is reached, if at all (block 410).

Figure 6:
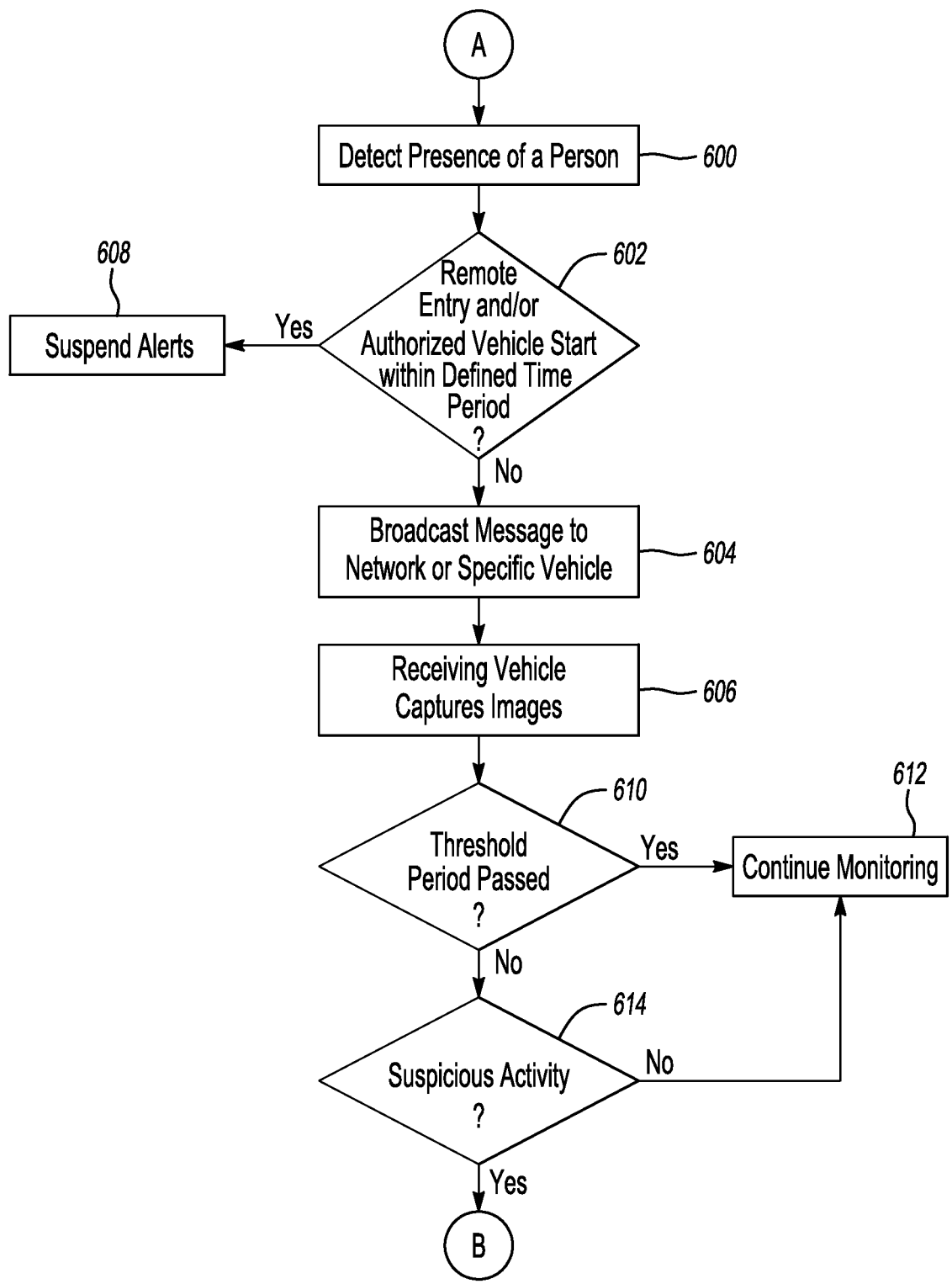
FIG. 6 illustrates a non-limiting example of the surveillance process by the vehicle surveillance network.
Figure 7:
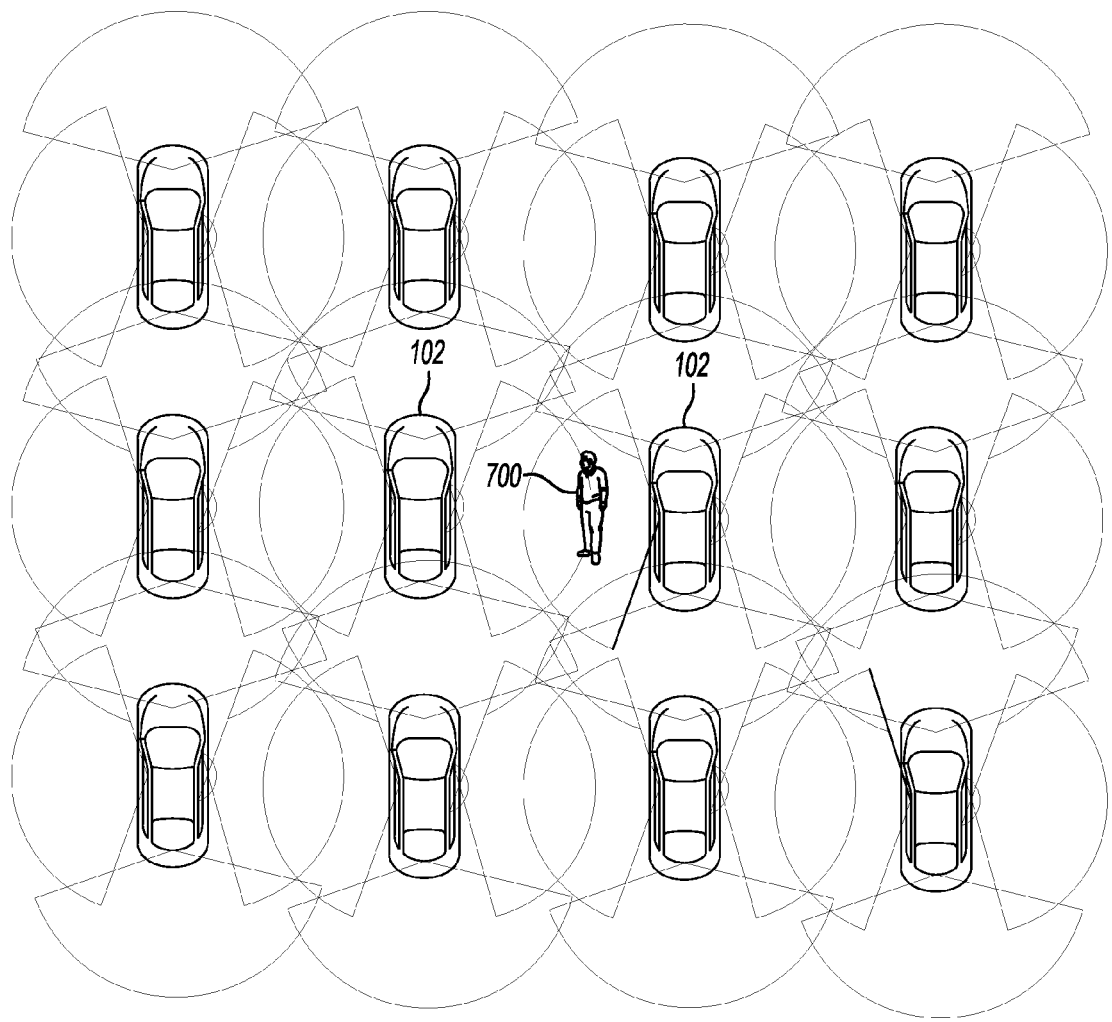
FIG. 7 illustrates a non-limiting example implementation of the example process of FIG. 6.

FIG. 6 shows an example application of the vehicle surveillance network. In this non-limiting example, the surveillance network has been created and the event that the network is monitoring is a potential theft of a vehicle in a parking garage. While parking garages have security systems installed, the security of the parking garage may be enhanced through the addition of a vehicle surveillance network. As a non-limiting example, the vehicle surveillance network may be used to monitor activity that is in a "blind spot" of the parking garage security system. FIG. 6 will be described below with reference to FIG. 7.

Continuing from circle block A on FIG. 3, one or more vehicles 102 may detect the presence of a one or more persons 700 in the vicinity of the vehicle(s) 102 (block 600). A determination may be made whether remote entry of the vehicle 102 and/or an authorized start of the vehicle 102 have occurred within a defined period of time since the person was detected by the vehicle (block 602). An authorized start may include, but is not limited to, remote start or vehicle startup with an authorized key. If either or both have not occurred, one or more messages may be transmitted or broadcasted from the detecting/compromised vehicle to the surveillance network (block 604). At least one vehicle in the surveillance network, which may be the vehicle closest to the vehicle transmitting the message(s), may receive the message(s) and begin capturing images of the detected person(s) (block 606). The broadcasted message to the surveillance network may include an identification of the detecting vehicle so the receiving vehicle may appropriately respond. Alternatively, the message may be directed to a specific vehicle in the surveillance network.

If a remote entry and/or an authorized vehicle startup have occurred within the defined period of time, all alerts may be suspended (block 608). This determination may be advantageous to prevent monitoring when, for example, the vehicle owner or another authorized vehicle user is the detected person.

Referring back to block 606, as the images are captured, or soon thereafter, the one or more vehicles 102 may identify a potential security threat based on an aging algorithm. The aging algorithm may define a threshold time period based on the time the detected person is in the vicinity of the vehicle 102 (block 610). If the threshold period has not passed, the monitoring will continue (block 612). If the threshold period has passed, a determination may be made, based on the captured images, whether the detected person is engaged in suspicious activity using, for example, video analytics (block 614). As a non-limiting example, the movement of the person and/or objects carried by the person indicate that the vehicle is under a security threat. The method may continue at circle block B and shown in FIG. 3 where a security threat is identified. Otherwise, monitoring of the detected person may continue (block 612).

Figure 8:
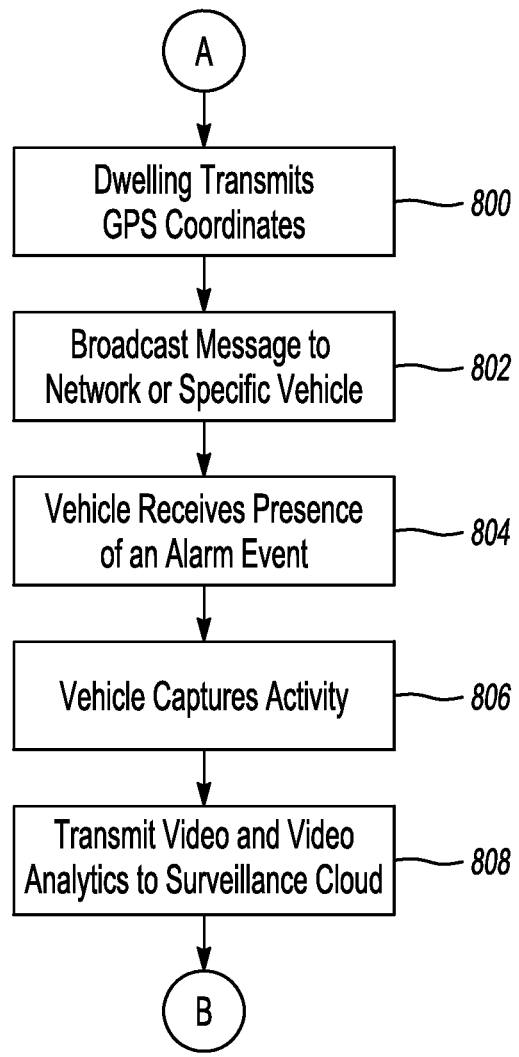
FIG. 8 illustrates a non-limiting process of object surveillance using a network of vehicles and buildings.

The vehicle surveillance network is not limited to being comprised of vehicles. In some embodiments, the vehicle surveillance network may also communicate with an infrastructure to monitor events. The infrastructure may include, but is not limited to, homes, schools, offices, and the like. As a non-limiting example, a vehicle-infrastructure surveillance network may be used when a burglary of a home is detected. FIG. 8 illustrates a process for performing surveillance with an infrastructure and will be described with referenced to FIG. 9 which illustrates a private dwelling 900 having one or more affixed RSUs 902 and one or more street-side RSUs 906. As described above, the RSUs may enable vehicle-to-infrastructure communication with one or more vehicles 102 of the vehicle surveillance network.

Figure 9:
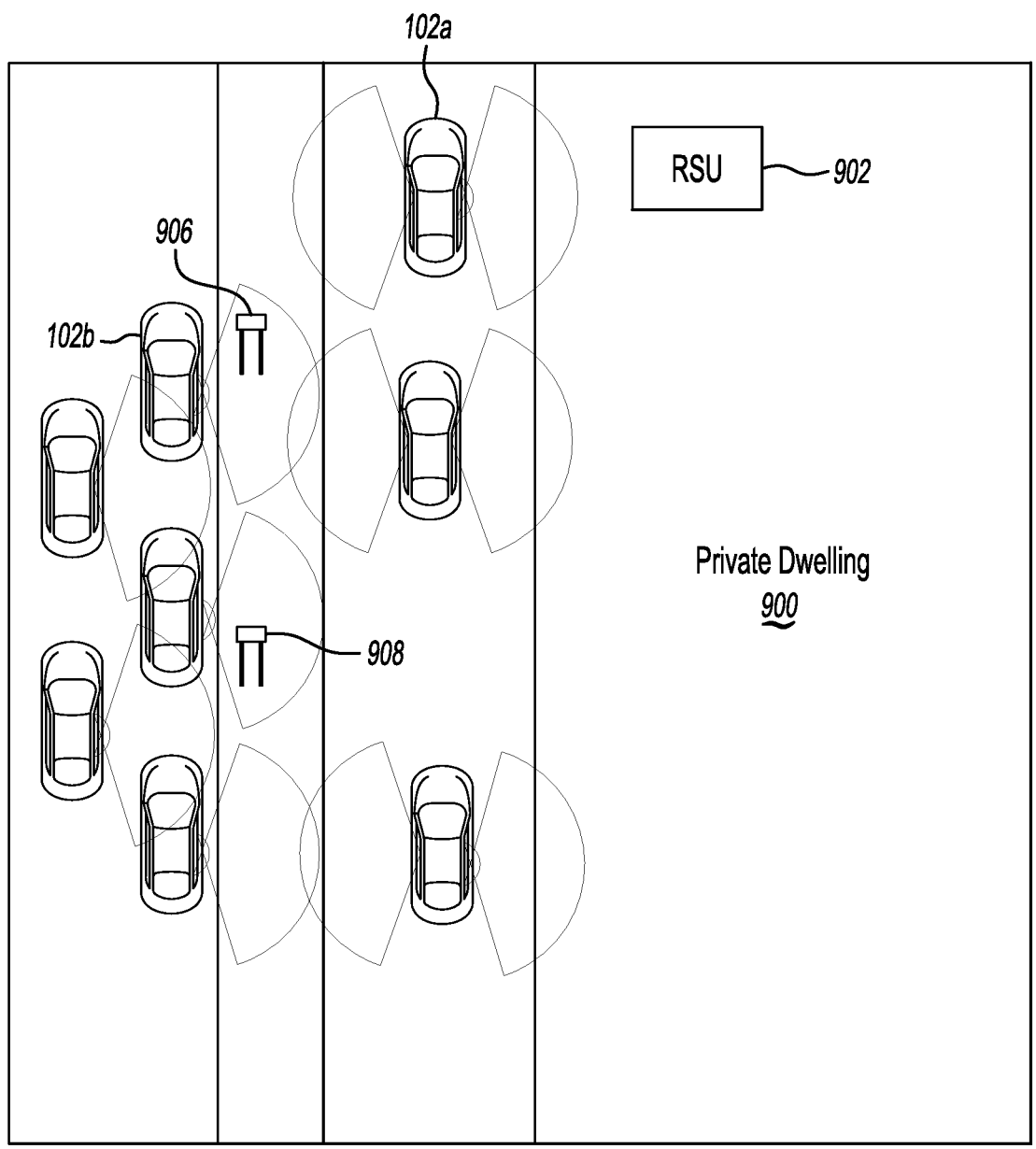
FIG. 9 illustrates a non-limiting example of the process of FIG. 8.

Each RSU 902, 906 may include a GPS module for obtaining GPS data. The GPS data, identifying the location of the dwelling 900, may be transmitted to the one or more vehicles 102a, 102b (block 800). By transmitting GPS data, the cooperative network between the dwelling 900 and the vehicles 102a, 102b may be established. While FIG. 9 illustrates multiple RSUs for purposes of illustrates different configurations of the RSUs, a single RSU may exchange information with the vehicle 102a, 102b, 102c, 102d. Further, while not labeled, it will be appreciated that each remaining vehicle also comprises the vehicle surveillance network.

When the dwelling 900 detects a security threat (e.g., the alarm is triggered), one or more messages may be transmitted or broadcasted from an RSU 902, 906 to the surveillance network (block 802). At least one vehicle in the surveillance network, which may be the vehicle closest to the dwelling 900, may receive the message(s) (block 804) and begin capturing images of the event (block 806). Based on the location information received identifying the dwelling 900, the receiving vehicle may appropriately respond.

In some embodiments, the message may be directed to a specific vehicle in the surveillance network (block 802). Vehicles, once in the network, may transmit identification information and/or location information to the RSU 902, 906. The information may be at least temporarily stored in memory of the RSU 902, 906. Using this information, the RSU 902, 906 may direct messages to specific vehicles in the surveillance network.

While capturing images of the activity, the capturing vehicle 102a or 102b may use video analytics to track the activity such as, for example, motion of the perpetrator. As a non-limiting example, the VCS 100 may determine the trajectory of the perpetrator and location. This data may be broadcasted to the surveillance network and each vehicle may receive the information to anticipate when the perpetrator is expected to enter the vehicle's field of view based on at least the broadcasted information and the location information of the receiving vehicle (block 808). In some embodiments, each vehicle in the network may be able transmit the information to a specific vehicle so that the receiving vehicle is prepared to track the perpetrator's motion. In all embodiments, each vehicle may act as a relay for tracking the movement of the perpetrator.

The process may continue at circle block B as shown in FIG. 3. One or more vehicles may transmit the images and tracking information to one or more event responders 208.

The messages received by event responders 208 may be textual and/or graphical messages. The messages may include at least one of location information of the object, person, vehicle(s) and/or physical structure or the captured images from the surveillance network. In some embodiments, the location information may be shown graphically, for example, on a digital map. Additionally or alternatively, the location information may include general location information (e.g., terminal X, "X" floor of the parking garage, or Main Street).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle system for creating a vehicle surveillance network, the system comprising:
    at least one vehicle camera in each of two or more vehicles, each vehicle camera configured to capture one or more images of objects or events outside of a respective vehicle;
    at least one communication module in each of the two or more vehicles for enabling communication between the two or more vehicles of the vehicle surveillance network; and
    at least one vehicle computer in each of the two or more vehicles, the at least one vehicle computer configured to:
        broadcast at least one message via the at least one communication module to one or more vehicles of the vehicle surveillance network;
        transmit instructions to the at least one vehicle camera to capture the one or more images in response to a broadcasted message received from the other of the at least two or more vehicles; and
        transmit the one or more captured images from the one or more vehicles to one or more event responders.

2. The vehicle system of claim 1 further comprising one or more vehicle sensors for detecting the proximity of an object to the vehicle.

3. The system of claim 1 wherein the communication module is a DSRC module.

4. The system of claim 1 wherein the communication module is an embedded vehicle modem.

5. The system of claim 1 wherein the at least one vehicle computer is further configured to:
   store the one or more captured images in memory; and
   obtain the one or more stored capture images from memory for transmission.

6. The system of claim 1 further comprising a wireless module for broadcasting the at least one message to the one or more vehicles of the vehicle surveillance network.

7. The system of claim 1 wherein the at least one vehicle computer is further configured to:
   determine a location of the object using the captured images; and
   transmit the location of the object to the one or more event responders.

8. The system of claim 1 wherein the at least one computer is configured to:
   receive video capability information for at least one of the two or more vehicles; and
   transmit the video capability information via the communication module to one or more vehicles of the surveillance network to define an area of interest for surveillance.

9. The system of claim 1 wherein the at least one vehicle computer is further configured to:
   monitor the presence of one or more objects in a field of view of the vehicle surveillance network;
   based on a threshold period of time, determine whether to output an alert notifying the event responder of the object in the field of view; and
   if the threshold period of time has been exceeded, output the alert notifying the event responder of the object in the field of view.

10. A computer-implemented method for utilizing a vehicle surveillance network to monitor objects and/or events, the method comprising:
    receiving at least one broadcasted message via at least one communication module from one or more vehicles of a vehicle surveillance network, the communication module being in each of two or more vehicles for enabling communication between the two or more vehicles of the vehicle surveillance network;
    transmitting instructions to at least one vehicle camera to capture one or more images of objects or events outside of a vehicle in response to the broadcasted message received from the other of the at least two or more vehicles;
    capturing the one or more images by at least one vehicle camera in each of the two or more vehicles; and
    transmitting the one or more captured images from the one or more vehicles to one or more event responders.

11. The computer-implemented method of claim 10 wherein the images from at least one vehicle camera of each vehicle in the network of two or more vehicles is an aggregate of images creating a field of view.

12. The computer-implemented method of claim 11 wherein the one or more images are stitched together to create the aggregate of images.

13. The computer-implemented method of claim 11 further comprising:
    monitoring the presence of one or more objects in the field of view of the vehicle surveillance network;
    based on a threshold period of time, determining whether to output an alert notifying the event responder of the object in the field of view; and
    if the threshold period of time has been exceeded, outputting the alert notifying the event responder of the object in the field of view.

14. The computer-implemented method of claim 13 wherein the alert is transmitted over the Internet.

15. The computer-implemented method of claim 10, wherein the broadcast message is received in response to at least one vehicle of the vehicle surveillance network detecting an unauthorized entry or start of the vehicle.

16. The computer-implemented method of claim 15 wherein the broadcasted message is transmitted from a vehicle in the vehicle surveillance network which is closest proximity to the receiving vehicle.

* * * * *